United States Patent
Kreiner et al.

(10) Patent No.: US 8,286,006 B2
(45) Date of Patent: Oct. 9, 2012

(54) PACKETIZED POWER

(75) Inventors: Barrett Kreiner, Woodstock, GA (US); Jonathan Reeves, Roswell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1173 days.

(21) Appl. No.: 12/021,697

(22) Filed: Jan. 29, 2008

(65) Prior Publication Data

US 2009/0193268 A1 Jul. 30, 2009

(51) Int. Cl.
*G06F 1/18* (2006.01)
*G06F 1/26* (2006.01)

(52) U.S. Cl. ........ 713/300; 713/310; 713/320; 713/330; 439/70; 439/330

(58) Field of Classification Search ........... 713/300, 713/310, 320, 330; 439/70, 330
See application file for complete search history.

(56) References Cited

U.S. PATENT DOCUMENTS

| | | | |
|---|---|---|---|
| 6,301,674 B1 * | 10/2001 | Saito et al. | 713/340 |
| 7,555,666 B2 * | 6/2009 | Brundridge et al. | 713/340 |
| 2005/0289374 A1 * | 12/2005 | Kim et al. | 713/300 |
| 2007/0041387 A1 * | 2/2007 | Ghoshal et al. | 370/395.52 |
| 2008/0077811 A1 * | 3/2008 | Dove | 713/300 |
| 2008/0224845 A1 * | 9/2008 | Bires | 340/501 |
| 2008/0263373 A1 * | 10/2008 | Meier et al. | 713/300 |

* cited by examiner

*Primary Examiner* — Kim Huynh
*Assistant Examiner* — Michael J Brown
(74) *Attorney, Agent, or Firm* — Parks IP Law LLC; Jennifer P. Medlin, Esq.

(57) ABSTRACT

Methods, systems, and devices are disclosed for producing and delivering packetized power within a DC computing environment. Within the DC computing environment a power requirement or request is communicated to a power router. The power router then determines a power source capable of fulfilling the power requirement and then causes the power to be delivered in packetized form. The packetized power is appended to a message header which allows the power packet to be received by the requesting device.

12 Claims, 6 Drawing Sheets

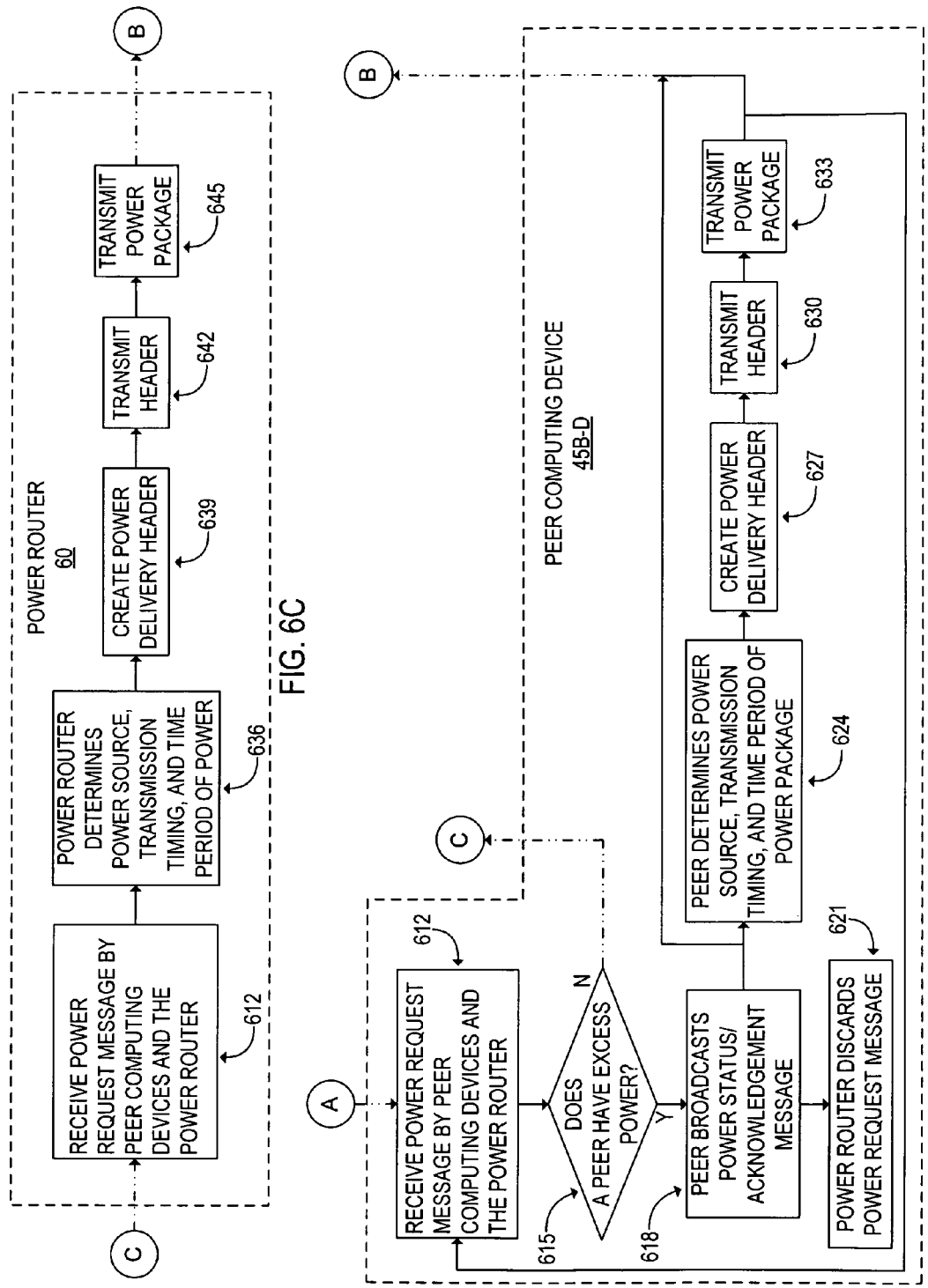

PACKETIZED POWER

BACKGROUND

Exemplary embodiments generally relate to direct current power distribution systems, methods and devices in a computing environment.

Most computing equipment operates using direct current ("DC") power. Heat generation resulting from the continual conversion of publicly available alternating current ("AC") power to DC power requires even more power to be expended to protect the computing equipment from damage resulting from the high heat levels. The incremental power required to replace the line losses resulting from constantly charged DC power busses also contributes to unnecessary power usage.

SUMMARY

The exemplary embodiments provide methods, systems, and devices for achieving packetized power distribution. A method, for example, provides for receiving electric power on demand within a computing environment. A power request message is broadcast from a first electronic component within the computing environment. The power request message establishes at least an amount of power requested. The method further provides for receiving a power packet comprising a delivery message header and a power packet. The packet includes at least a portion of the requested power.

Exemplary embodiments include a computer readable medium containing instructions that when executed within a logic device within a computing device operating within a computing environment causes the computing device to receive a power request message from a first electronic component. The power request message establishes an amount of power requested. If the first electronic component is a local electronic component within the computing device and a second electronic component which is also a local component within the computing device has excess stored power available to the second electronic component in excess of the amount of power requested, then a power packet comprising a delivery message header and a power packet including at least a portion of the requested power is transmitted to the first electronic component from the second electronic component.

Exemplary embodiments may include a power router comprising a plurality of power sources and a power router logic module. The power router logic module may provide for receiving a power request message from an electronic component within a computing environment, determining a best available power source from the plurality of power sources based at least in part upon information contained in the power request message and initiating the transmission of a power packet in at least partial satisfaction of the power request message.

Exemplary embodiments may include a power distribution system distributing power packets within a computing environment. The power distribution system may include a source of direct current ("DC") power thermodynamically isolated from the computing environment and conductively delivering DC power to the computing environment. Within the computing environment the system may include a power router, a computing device comprising at least one electronic component and a DC power bus connecting the power router to the computing device.

Exemplary embodiments may include a computing device which comprises a processor. The processor is powered by a first power supply and at least one other electronic device. The other electronic device is powered by a second power supply, and the first power supply is independent from the second power supply. The computing device may also include a switch fabric interconnecting the processor, the other electronic device, the first power supply and the second power supply. The switch fabric allows a power packet to be transferred from the second power supply to the first power supply and vice versa. The computing device may also include a computing device router/controller monitoring the power stored within the first and second power supplies and controlling the switch fabric.

Another exemplary embodiment may also include a power packet. The power packet may comprise a packet header comprising packet destination information in the form of a sequence of electric power pulses. The sequence of electric power pulses comprise a plurality of individual power pulses of various predefined combinations and permutations of pulse widths and amplitudes. The power packet may also comprise a power packet. The power packet comprises a predetermined voltage applied to a common bus between a power source and a power recipient for a specified time duration. The power packet is appended to, but separated from, the packet header by a specified time period.

BRIEF DESCRIPTION OF THE DRAWINGS

FIG. 6B is a logic flow diagram for a peer computing device from which power is requested.

FIG. 6C is a logic flow diagram for a power router responding to a power request message.

DETAILED DESCRIPTION

The exemplary embodiments will now be described more fully hereinafter with reference to the accompanying drawings where like reference numbers refer to like components. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Figure 1:
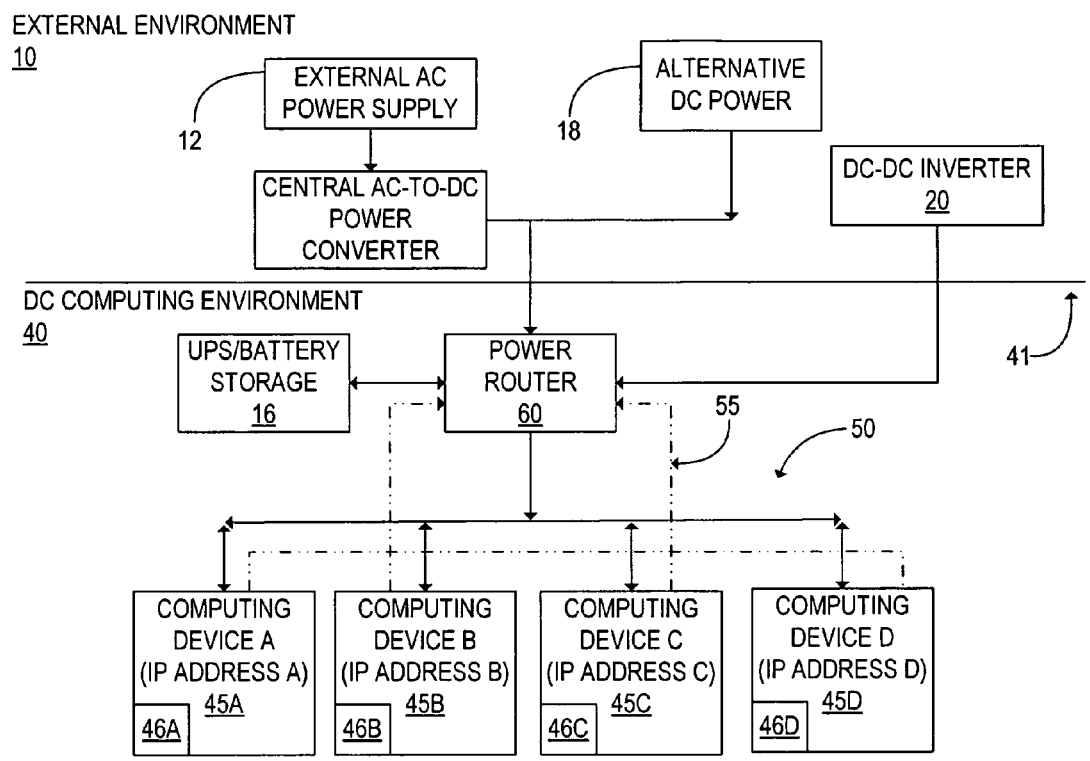
FIG. 1 is a schematic illustrating a single tier DC computing environment.

FIG. 1 is a block diagram illustrating a simplified packetized power distribution system. FIG. 1. illustrates an area 10 that is external to a Direct Current ("DC") computing environment 40 and illustrates the DC computing environment 40 itself. In order to minimize the energy costs required to air condition the DC computing environment 40, an external Alternating Current (AC) power supply 12, an AC-to-DC converter(s) 14, a DC-DC inverter(s) 20, and alternative DC power sources 18 (i.e. solar panels, DC generators, etc.) and any other non-computing, heat producing devices may be thermodynamically isolated from the DC computing environment 40. According to exemplary embodiments, all electronic devices inside the DC computing environment 40 operate on DC power. As such, most power inputs may be converted to DC power outside the DC computing environment 40 and merely plugged into DC connectors (not shown) installed through DC computing environment boundary walls 41.

Inside the DC computing environment 40 reside multiple computing devices (45 A-D). There may be any number of DC computing devices. For simplicity of discussion, the number of DC computing devices has been limited to four. In addition to number, the computing devices may vary widely by type or function and may be stored in cabinets, racks or other means that are well known in the art. The cabinets or racks may themselves contain integrated computing devices and/or DC powers supplies. The computing devices 45 A-D may be engaged in any function or process desired by the operator of the DC computing environment 40.

The various DC computing devices 45 A-D may be each interconnected through a single DC power bus 50 over which each DC computing device may receive DC power. However, it should be recognized that multiple DC power busses may be used if so desired to meet a particular need. The DC power bus 50 may be de-energized with the various DC computing devices being run off of a local rechargeable local DC power supply (46 A-D) such as a rechargeable battery or capacitor. The DC power bus 50 may also act as a synchronous messaging bus whereby each DC computing device 45 A-D, or a component thereof, may communicate with another DC computing device, or with a component thereof.

Alternatively, or in addition to, there may also be a separate messaging bus 55 that may optionally handle message communications between components of the DC computing devices 45 A-D. The messaging bus 55 may be synchronous or asynchronous. The messaging bus 55 may be fiber optic or wire.

Figure 2:
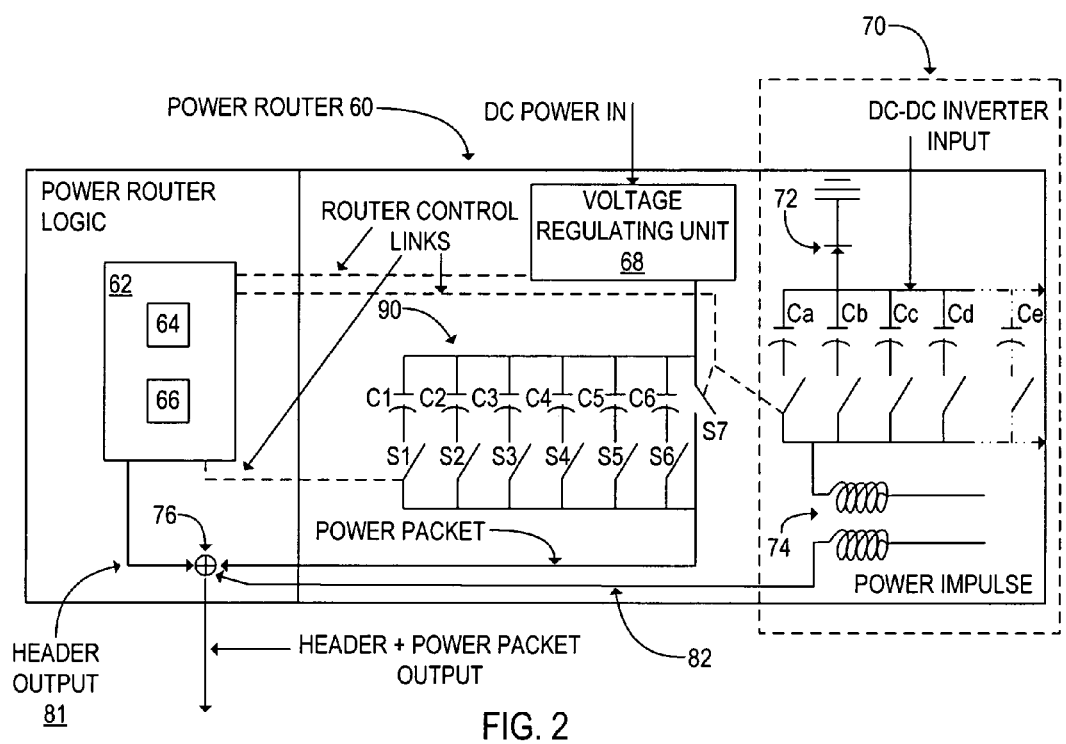
FIG. 2 is simplified schematic of an exemplary power router.

The DC computing environment 40 may also include a power router/hub 60. FIG. 2 is a simplified depiction of the power router 60. According to exemplary embodiments, the power router 60, monitors the power consumption and local power storage levels of all the electronic devices 45 A-D, their components and their local power supplies. The power router 60 also communicates with at least a portion of a switch fabric (not shown) over the DC power bus 50. The power router 60 may control the switching connection of each DC computing device 45 A-D to the DC power bus 50. Alternatively, each DC computing device 45 A-D may control its own local switches, connecting the DC computing device 45 A-D to the DC power bus 50 in response to a message received from the power router 60. The switches that make up the switch fabric or that are otherwise discussed herein may be physical switches, transistors or any other type of switch known to one of ordinary skill in the art that may satisfy a particular need of a system designer.

The power router 60 may comprise at least logic circuitry 62, a processor 64 and/or other computer readable media 66 containing instructions thereon to monitor and manage the power supplies to each DC computing device 45 A-D within the DC computing environment 40. The power router 60 may sense the power level of each power storage device 46 A-D within the DC computing device 45 A-D. The power router 60 may also receive and track power request messages from each DC computing device 45 A-D, schedule power delivery to each DC computing device and control the actual delivery of DC power to the various DC computing devices via the DC power bus 50.

Power may be delivered to the DC power bus 50 in a number of ways. Non-limiting examples may include switching in one or more batteries 16 of specific voltage and power delivery capability. Power may also be provided via a DC voltage regulating unit 68, a capacitor bank 80 or a high voltage impulse generator 70. The preceding examples of power sources are merely exemplary and may be used in combination with more than one of any particular power source. DC power may be sourced from any desired source. Non-limiting exemplary sources include sources such as a solar panel, battery, capacitor, DC generator and an AC-DC converter.

The capacitor bank 90 may provide power to the DC power bus 50 by discharging one or a combination of capacitors C1-C6 simultaneously or in a particular combination or order. The number of and arrangement of capacitors depicted herein is purely arbitrary for simplicity of discussion and may comprise any number of capacitors of varying sizes, in any arrangement, as may meet the needs of a system designer. The power from the capacitor bank 90 may be used to deliver power to any of the DC Computing devices 45 A-D via the DC Power bus 50 by closing corresponding switches S1-S6. As mentioned above, the switches S1-S6 may be any type of switches including transistors or other solid state devices. The switches S1-S6 may be controlled by the power router logic 62.

After discharge, the corresponding capacitor switches S1-S6 may be returned to their normally open positions allowing the corresponding capacitor to recharge from whichever power source is selected by the power router logic 62. The bank or banks of capacitors 90 may be used in a "Gatling Gun" fashion (discharging one right after another), in any desired order. Some capacitors C1-C6 may discharge while others are being recharged. While the charging/discharging mechanism is depicted herein as a switch for simplicity of discussion, a system designer may use any functional alternative device or sub-circuitry to accomplish the efficient charging/discharging of the capacitors C1-C6 and control thereof.

The battery 16 and or voltage regulating unit 68 may be used to provide power to the DC power bus 50 by closing a switch S7 or its functional equivalent. As a non-limiting example, the voltage regulating unit 68 is depicted along with a switch S7. The power router logic 62 may both control the voltage regulating unit 68 output as well as connect the voltage regulating unit to the DC voltage bus 50 via the switch S7. The battery 16 may also be connected directly to the DC power bus 50 by its own switch (not shown) if so desired.

FIG. 2 also depicts the simplified pulse generator 70. The pulse generator 70 is a simplified depiction and may be any type of pulse generator available. The simplified pulse generator 70 may also uses a bank of capacitors $C_a$-$C_f$ although a single capacitor may suffice.

The DC-DC inverter 20 (See, FIG. 1) depicted here in this simplified design may convert DC voltage into a series of DC pulses to create a varying voltage and may step up the voltage to a desired level which charges the capacitor(s) $C_a$-$C_e$. The number of capacitors chosen here is purely arbitrary for discussion purposes. Corresponding switches $S_a$-$S_e$ may be closed by the power router logic 62 to place any number of the capacitors $C_a$-$C_f$ in parallel. When a voltage impulse is required by one of the computing devices 45 A-D, the power router logic 62 may place a switching device 72 into a short circuit condition allowing one or several of the capacitors $C_a$-$C_f$ to discharge across the primary coil of a transformer 74 producing a high voltage pulse for which the voltage depends upon the step up ratio of the transformer. Because a capacitor discharges in an exponential fashion, the varying voltage and current discharge allows use of the transformer step up effect. As is commonly known by one of ordinary skill in the art, a first order resistance-capacitance (R-C) circuit in series produces a voltage over time of the form $V_o * e^{-t/RC}$, where RC is the time constant indicating the speed by which the discharge is accomplished. In the case where the only resistance ("R") is the resistance of a wire/transformer coil, R may be very small allowing a fast discharge approximating a pulse waveform. As is well known in the art, a unit pulse delivered over the DC power bus 50 will instantaneously charge an uncharged capacitor to 1/C volts and 1/2C joules, where C is the capacitance of the capacitor in Farads.

As discussed above, the power router 60 may direct the switch fabric that controls connection to and from the DC bus 50 and may monitor the power status of any number or power supplies located throughout the DC computing environment 40. The power router 60 may direct the switch fabric by sending and receiving messages to and from the various DC computing devices 45 A-D and/or their components. Such messages may be comprised of power in the form of data and may be manifested in a number of ways. Messages may be of any type and function as desired by the system designer. However, exemplary messages may include a power request request message, a power request acknowledgement message and a power delivery message.

Figure 3:
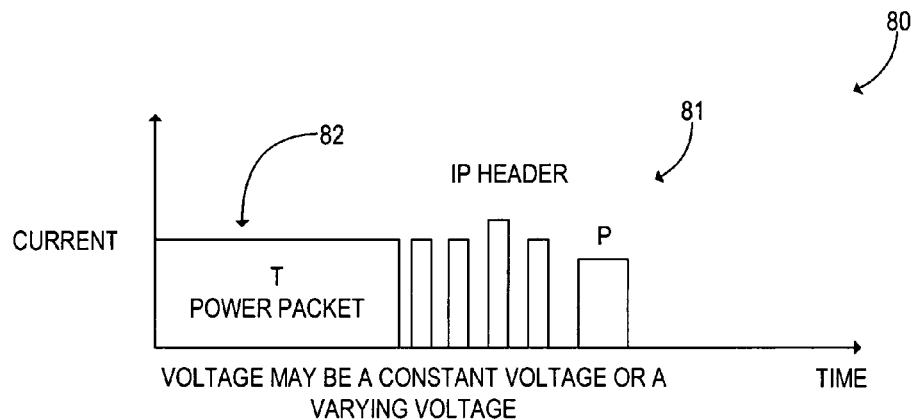
FIG. 3 is a depiction of a power packet message.

FIG. 3 illustrates a non-limiting example of a power delivery message 80. The power delivery message 80 message may include a message header 81 that includes routing data and an indication of delivery priority. The power delivery message may also include a power packet 82.

The message header 81 may consist of a series of DC square waves or a combination of step functions, where the function F(t) is positive for a time period P (e.g. t=P) and zero before and after the time period P. A combination of square waves with different time periods and amplitudes may convey information to the various computing devices 45 A-D. The combination of square waves may be used in a fashion resembling a Morse code. However, instead of being limited to merely two time periods P (i.e. long and short), the message may be comprised of pulses of several different time periods and/or voltage amplitudes. As a non-limiting example, such pulses may be created by switching one or more DC voltage sources into and out of the connection with the DC bus 50 in a precise pattern that may be created and stored in a computer readable medium. Non-limiting examples of computer readable media may include a processor, a flash memory, a magnetic disk, an optical disk, a read only memory, a random access memory or other electrical circuits comprising combinations of electrical components such as capacitors, inductors and resistors.

Further, the message delivery message 80 may include the power packet 82. The power packet 82 may be a power transmission or a distribution to any of the computing devices 45 A-D of any desired voltage or amperage over any desired time period T. The power packet 82 may take any desired waveform other than a continuous sinusoidal AC wave form. The number of potential wave forms is infinite. However, for discussion purposes, the packets 82 in the form of a square wave, a pulse and an exponentially decaying wave will be specifically addressed. More complicated waveforms utilizing the convolution theorem of function analysis may be found useful by one of ordinary skill in the art.

The power delivery message header 81 may include specific information. Non-limiting, exemplary information that may be included in the power delivery message header 81 may include a power recipient identification code, the amount of power being delivered in the appended power packet 82, and whether a follow on power packet 82 is to be expected and when. Information may also include any switching information required to control the switch fabric within the DC computing environment 40 in order to allow direct delivery to the requesting device. According to exemplary embodiments, because the DC bus 50 is a single, normally de-energized bus, only a single power delivery message may be transmitted on the DC Power bus 50 at a time. A direct conducting path between the source of the power package and the recipient must be established before the power packet 82 is transmitted. As such, the power delivery message header 81 may contain the appropriate switch control information to close the appropriate switch pathway to the receiving device before the power packet 82 is transmitted.

The power packet 82 may be appended to the power packet 82 at a summation point 76 (See, FIG. 2). The summation point 76 may be a wire junction. If the summation point 76 is a wire junction then the power router 60 may control the appending of the power packet 82 to the power packet 82. Alternatively, the summation point 76 may be a logic device that controls any of the same switches or devices controlled within the power router 60, discussed above in regards to FIG. 2. As a non-limiting example, the computing device at the summation point 76 may control the triggering device 72 or the switches $S_1$-$S_7$. A non-limiting example of a logic device may be a processor or a programmable logic device such as a field-programmable gate array.

Figure 4:
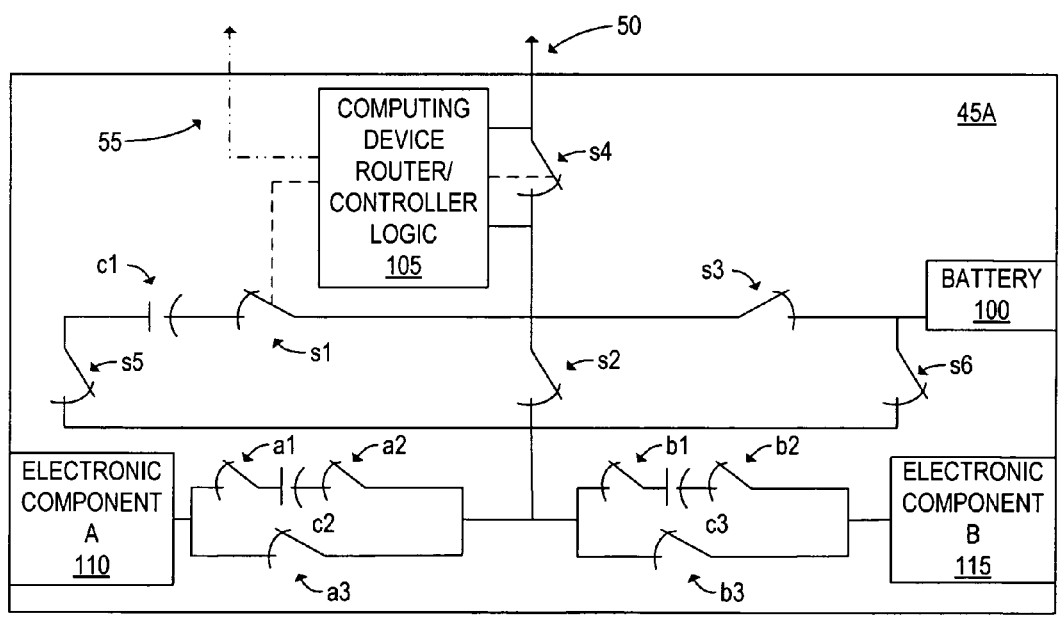
FIG. 4 is a schematic illustrating a switch fabric and power supplies of a schematic computing device.

FIG. 4 is a simplified functional diagram of the computing device 45A that may be used in various embodiments. Other more sophisticated arrangements may be found desirable to meet a specific design requirement by a manufacture or system designer without parting from the disclosure herein. As a simple and non-limiting example, the computing device 45A may represent a server with internal components A and B. Non-limiting examples of such components may be any type of power consuming device such as a flash memory or a disk drive. The internal components A 110 and/or B 115 may operate sporadically or continually. The internal components A and B may normally be powered by a battery 100. Preferably the battery 100 is maintained at a desired power/charging level and may be periodically recharged to a desired level by receiving the power packet 82 of the power packet delivery message 80.

In a non-limiting, exemplary embodiment, the computing device 45A may be connected and disconnected from the power bus 50 by a switch $s_4$. The computing devices 45B-D may have corresponding switches to switch $s_4$ (not shown). The switch $s_4$ may be a normally open switch thereby isolating the computing device 45A from the DC power bus 50.

The computing device 45A may also include a computing device router or control logic 105. The computing device router 105 may communicate with the power router 60 via the DC Power bus 50 or via the communication bus 55. The computing device router 105 may send, receive and respond to messages sent to and from the power router 60 by reading the message header 81. As a non-limiting example, the computing device router 105 may detect a power delivery message on the DC Power bus 50. The header 81 of the power delivery message 80 may identify the switches to be opened or closed and when that should happen. Upon determining that a power packet, such as the power packet 82, is to flow to the computing device 45A, the computing device controller 105 may close switch $s_4$. It should be understood that if the power packet 82 is addressed solely to the computing device 45A, the computing device controllers 105 for the computing devices 45 B-D would ensure that corresponding switches $s_4$ within the computing devices 45 B-D would remain in their normally open positions, isolating the computing devices 45 B-D from the arriving power packet 82. However, if the power message delivery message header 81 is addressed to any other computing devices 45 B-D, the corresponding switches $s_4$ may also be closed such that the power packet 82 may also flow to the other designated computing devices simultaneously or in a priority order.

The circuitry depicted in FIG. 4 is purely exemplary and simplified to facilitate the discussion herein. The concepts applied in this example may be expanded to operate within much more sophisticated circuits and devices as may be required for a specific topology or purpose. Similarly, the computing device router 105 may control any or all of switches $s_1, s_2, s_3, s_5, s_6, a_1, a_2, a_3, b_1, b_2$ and $b_3$ as directed by its control logic in response to receiving a power delivery message header, such as the header 81. As a non-limiting example, if the power packet 82 is intended to recharge the battery 100, the computing device controller 105 may shut the switches $s_3, s_5, a_3$ and $b_3$ and ensure that switches $s_1, s_2$, and $s_6$ are open. In such a configuration, the battery 100 may be charged by the incoming power packet 82 while electronic components A 110 and B 115 operate as necessary using power drawn from capacitor $c_1$. Alternatively the switches may be arranged such that the electronic components A 110 and B 115 operate off of power drawn from capacitors $c_2$ and $c_3$, respectively, if $c_1$ is insufficiently charged. To determine the proper switch pattern, the computing device router 105 may be able to detect the power levels in the capacitors $c_1$-$c_3$ and calculate the power consumption occurring or to occur at the electronic components A 110 and B 115. After the power packet 82 has been received, the switching pattern may be reconfigured to allow the electronic components A 110 and B 115 to again operate off of power from the battery 100 and allow capacitors $c_1$-$c_3$ to be recharged from the battery 100 or from another power packet that may be requested by the computing device router 105.

Similar to the power router 60, the computing device router 105 may monitor the power levels of all of its capacitors $c_1$-$c_3$, its batteries, such as the battery 100, and the power consumption of its electronic components A 110 and B 115. The computing device router 105 may then calculate how much power that its components will need and in how much time. The computing device router 105 may convey its power request in a power request message to the power router 60. A power request message is similar in construction to a power delivery message, such as the message 80, but without the power packet 82. In the header 81, the power request message may stipulate which computing device 45 A-D needs power, when it needs power, how much power that it needs and with what urgency.

In response to the power request message header 81, the power router 60 may schedule delivery of the DC power packet 82 to the computing devices 45A-D on a priority schedule based on time, relative power deficit and a priority based on ranking the critical services provided by the components of the computing device 45 A-D. The ranking priority ensures that essential components get priority power delivery and in the case of an absolute deficiency across the entire DC computing environment, the least essential components may shut down first in an orderly hibernation sequence.

During periods of low operating tempo, a single power packet, such as the packet 82, may be distributed to a single electronic component, such as the component 110, for example. As non-limiting examples, such a power packet may be sourced by discharging a capacitor, switching in a battery or by providing a high voltage impulse. The capacitor chosen to discharge (i.e. C1) may have a power content and a voltage that is sufficient to charge the battery 100, and/or the capacitor $c_1$, plus that amount of power needed to overcome any line losses along the power bus 50, in any switches between capacitor C1 and capacitor $c_1$. While the capacitor $c_1$ is receiving a power packet, the computing device router 105 may observe the power level within capacitor $c_1$ and isolate capacitor $c_1$ as the capacitor's power level peaks. By opening switches $s_1$ and $s_5$ in this exemplary topology, the transferred power remains stored in capacitor $c_1$.

The power router 60 may decide that it is expedient to transmit a larger amount of power to multiple computing devices 45A-D by sending a "multicast" power delivery message to the multiple computing devices 45 A-D simultaneously. As such, multiple receiving devices may be addressed in the power delivery packet header 81. When transmitted, the packet header 81 may cause the respective computing device routers 105 to switch into the DC power bus 50 and align their internal switches $s_1$-$s_4$ such that the desired batteries 100 or capacitors $c_1$-$c_3$ may be charged simultaneously.

In the alternative, multiple devices may receive power delivery from a single power packet, such as the packet 82, sequentially where the switch $s_4$ for each computing device 45A-D is closed then opened in a sequential order. As a non-limiting example, the first computing device 45A may be switched into and then out of the DC power bus 50 to receive a pre-designated amount of power first, followed by the computing devices 45B and 45C, sequentially. Such a technique may lend itself to receiving an exponentially decaying power wave form where the highest power level leads and then attenuates over time. As such the device 45A with the largest power requirement would be connected to the DC power bus 50 first followed by the second device 45B with a lower power requirement and maybe the third device 45C with even a lower power requirement.

The power delivery message 80 may be produced in a number of ways. Non-limiting examples may include passing the power packet 82 through the power router circuitry 62 where the header 81 is appended. Such a method may resemble the processing of a Transmission Control Protocol/Internet Protocol (TCP/IP) packet where the power packet 82 is the message to be delivered. However, because the power package 82 voltage/current may be large relative to the voltage/current of the header or the voltage/current ratings of the various components within the power router circuitry 62, processing a relatively large power packet 82 through the power router 60 may be harmful to the routing circuitry 62. As such, the header 81 may be processed by the power router 60 and then appended to, or transmitted slightly in advance of, the front edge of the power packet at a summing operation, such as the summation point 76, outside and down stream of the power router 60. (See FIG. 2).

The summation technique outside of the power router 60 may also allow the delivery of high voltage impulses. Although, the current and energy delivered into a capacitor may change instantaneously without an impulse, it is a well known principal of electronics that the voltage across a capacitor can not change instantly unless an impulse is supplied. An impulse of voltage or current is capable of inserting some energy into a capacitor instantaneously. For example, it is well known in the art that a unit impulse of current into a capacitor of capacitance C results in a 1/2C joules of energy being imparted to the capacitor and leaving a voltage across the capacitor equal to 1/RC volts, where R is the resistance of the wire and may be very small. Therefore, it may be advantageous to provide power to a capacitor somewhere in the DC computing environment 40 using an impulse wave form. However, a high voltage impulse may damage the circuitry of the power router 60. Delivery of the impulse may be accomplished by appending the impulse to the back end of the power message delivery header 81 after the power router 60 has transmitted the header.

Power may be delivered from one computing device 45A-D to another in what may be described as a peer-to-peer power sharing. As a non-limiting example, the computing device router 105 of the computing device 45A may determine that it needs a specific amount of power within the next 2 seconds. The computing device router 105 may broadcast a power request message, such as the message 81. The computing device router 105 of the peer computing device 45B may detect the power request message, may have a sufficient amount of power in a local storage device and may then respond with a power delivery message 80. The power delivery message may include all or a portion of the requested in the power packet 82. The power may then be delivered from the capacitor $c_1$ or the battery 100 internal to the peer computing device 45B to the computing device 45A over the DC power bus 50. As such, each computing device 45A-D within the DC computing environment 40 may also be a power source for other devices within the DC computing environment.

Figure 5:
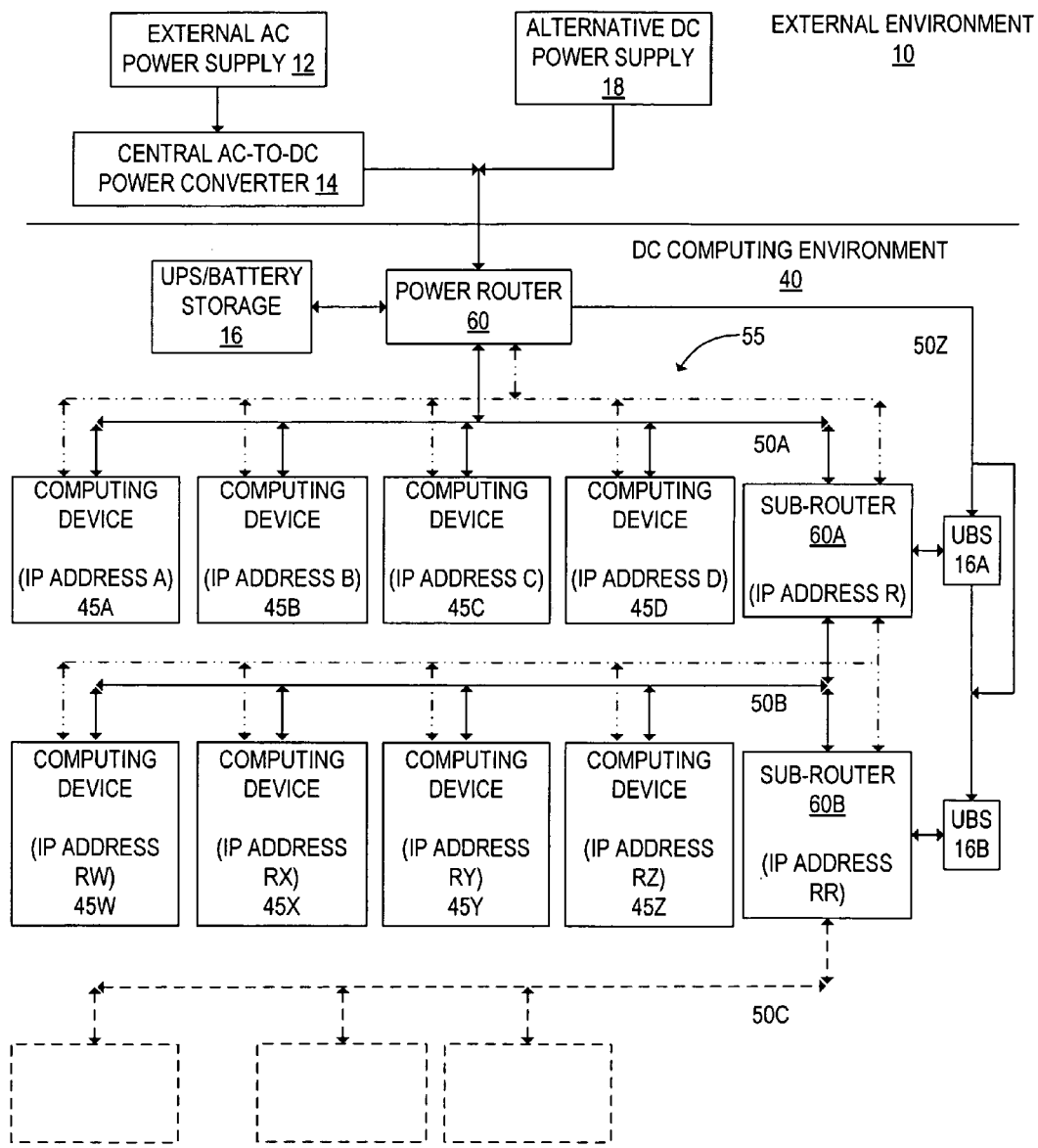
FIG. 5 is a schematic illustrating a multi-tiered DC computing environment.

More than one DC power bus 50 may be connected in series or may be connected in parallel. By segregating into multiple DC power busses, better control and lower line losses may be achieved by facilitating local peer-to-peer power sharing instead of requiring frequent long haul power transport across a potentially large DC computing environment 40. As a simple, non-limiting example, FIG. 5 depicts three DC power busses 50A-C connected in series. The DC power bus 50A is depicted as having the computing devices 45A-D as shown FIG. 1, and the DC power bus 50B is depicted as having computing devices 45W-Z. As a further non-limiting example the computing devices 45A-D and 45W-Z may each have their own messaging addresses as shown. The messaging addresses may be conventional IP addresses or custom addresses designed specifically for use within the context of packetized power. The DC power bus 50B may have its own computing devices connected to it as well. The computing devices 45A-D and 45W-Z may or may not be of the same type or may or may not require the same general level of power consumption.

As a continuation of the example, the computing devices 45W-Z may be used less often or simply be of a nature that draw less power (e.g. smaller devices). The configuration or arrangement of the DC computing environment 40 is arbitrary as may fit the needs of a system designer for a particular purpose. Such a series configuration may be described as a power waterfall or a power cascade where DC power flows from the power router 60 (or a source controlled by the power router) to one level then to another.

Each DC power bus 50A-B may also include a power sub-router 60A-B. The power sub-router 60A-B may coordinate power request messages, acknowledgement messages and power delivery messages for those computing devices connected to the respective remote DC power bus. As a non-limiting example, the power sub-router 60A may coordinate power delivery between the computing devices 45W-Z and the power sub-router 60B. The power sub-router 60B may be treated like an additional computing device by the power router 60. Each sub-router 60A-B may carry out similar functions and be designed similarly to the power router 60 but may or may not include all of the power router's features or capabilities as may be desired by a system designer. Further, each sub-router 60A-B may also permit each bus 50A-C to be segregated from the other busses such that different power delivery packets and messages may be transmitted separately and simultaneously to what is occurring on other busses.

Each sub-router 60A-B may also have its own Un-interruptible Power Supply (UPS)/Battery storage 16A-B. The power router 60 may or may not monitor and supply power directly to each UPS/Battery storage 16A-B directly via a separate DC power bus 50Z. Such a feature may be desired in order to ensure reliability in cases of heavy or extreme power demand.

As a non-limiting example, the power sub-router 60A may receive power request messages, such as the message 80, from the computing devices 45W-Z and provide power from the power sub-router's own UBS/Battery 16A or from any capacitors that may be associated with the DC power bus 50B. It may also be the case that the sub-router 60A may know that the computing device 45W may have excess power in a battery or a capacitor and therefore may cause the computing device 45W to discharge power to a power deficient computing device on the same bus such as the computing device 45Z. If the power demands are such that additional power is needed, the sub-router 60A may consolidate multiple power request messages into a single power request message which would be forwarded to the power router 60. As a result, the power router 60 may send one or more power delivery messages to the sub-router 60A. The power packets 82 may be stored in the corresponding UPS/battery 16.

Figure 6A:
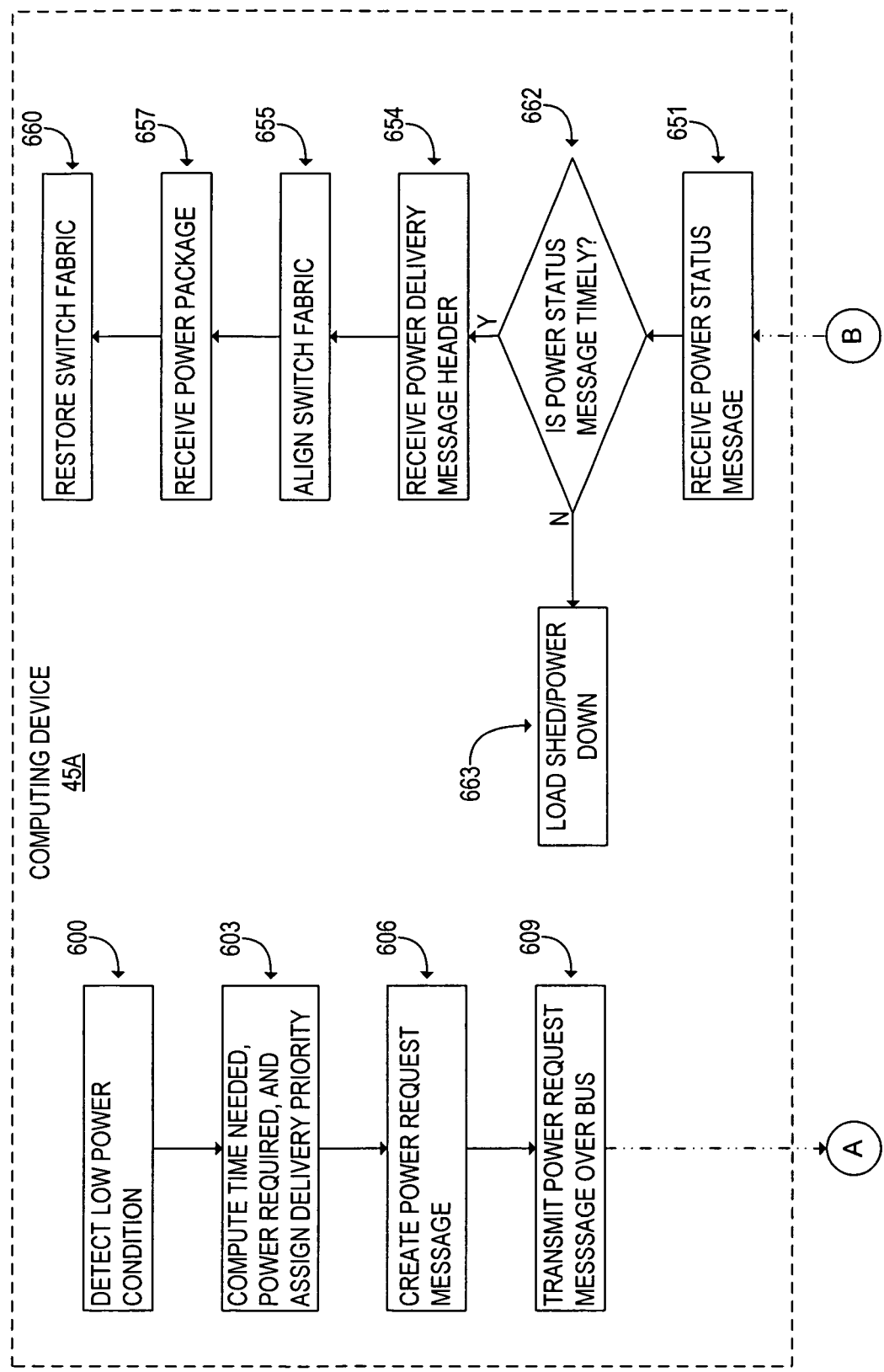
FIG. 6A is a logic flow diagram for a computing device requiring power.

FIGS. 6A-6C illustrate a flow chart that demonstrates an exemplary method for producing and delivering packetized power to a computing device, such as the devices 45 A-D. FIG. 6A contains the processes that may be undertaken at the computing device receiving power. FIG. 6B contains those processes that may occur at a peer computing device that is sending power. FIG. 6C contains those process that may occur at the power router 60.

At process 600, the computing device 45A detects that it has a power deficiency related to itself or to one of its electronic components. Such detection may be done via a power meter, voltmeter, ammeter or through the use of any number of solid state devices and/or logic circuits. Upon the detection of a power deficiency, the computing device router /control logic 105 may compute several factors such as the amount of power required to be delivered and when the power will be needed. The computing device router/control logic 105 may also determine a priority designation based on the importance of the device needing power, the power available to the device and when the power is needed. Once the computing device router 105 determines the power requirements, the computing device router 105 produces a power request message, such as the message 80, at process 606 comprising at least a message header 81. Once compiled, the computing device router 105 may transmit the power request message 80 to the entire DC computing environment 40 via the power bus 50 (or alternatively to the asynchronous bus 55, if so designed) in process 609. The computing device router 105 may be connected to both sides of switch $S_4$. As such, the message 80 may be sent without closing switch $S_4$.

Because all of the components in the DC computing environment 40 are listening to the DC bus 50 simultaneously, the power request message is received by the power router 60 as well as the peer computing devices 45 B-D and sub-router 60A, if so designed. As such, the peer computing device 45 B-D has power delivery priority due to its shorter delivery distance which makes for lower line losses and faster delivery times. As such, the power request message 80 is received by the power router 60 and the peer computing devices 45 B-D at process 612. Each peer computing device 45 B-D determines whether it is in possession of power in excess of its immediate requirements and sufficient to meet the power requested at decision point 615. If one or more of the peer computing devices 45 B-D has excess power, then the peer computing device sends a power status or acknowledgement message at process 618. Which peer computing device(s) 45 B-D ultimately delivers power may be determined by the logic 62 in the power router 60 or may be determined locally at the peer computing devices by an algorithm or other logic. How the decision is made is at the discretion of a system designer to satisfy a particular design requirement. If a peer computing device, such as the peer computing devices 45 B-D, possesses and can deliver the requested power, the power router 60 may discard the power request message 80 at process 621.

Alternatively, the power router 60 may assist in controlling the delivery of the power from one peer computing device 45 B-D to the requesting computing device 45A or may supply any ultimate deficiencies. For example, instead of discarding the power request message 80 at process 621, the power router 60 may recognize that the computing device 45A may now be closer to the point of requiring additional power after having provided power to the peer computing device 45 B-D. As such, the power router 60 may proceed to schedule power delivery to the computing device 45A in anticipation of a subsequent power request message 80 being sent by the computing device 45A.

The power acknowledgement message is received by the requesting computing device 45A at process 651. The power acknowledgment message may contain information useful to the requesting computing device 45A, such as the power packet 82 will arrive in two or more separate packets.

The computing device router/controller 105 may, at process 636 determine the actual power source, the transmission timing and the actual amount of power to be sent taking into account line losses between the sending device and the receiving device as well as the wave shape of its power packet (i.e. square wave, decaying exponential, impulse, etc.). The transmission timing may be based partly upon the internal limitations peer computing device 45B-D and the information provided in the power request message 80 provided at process 606.

The computing device router 105 may then create a power delivery message header, such as the header 81, at process 639 and transmit the header via the DC power bus 50 after closing the switch $S_4$. The computing device router/controller 105 may then align its switch fabric to discharge the requested power to the DC power bus 50 following the message header 81. For example, the computing device router/controller 105 may close the switches $s_3$ and $s_4$, and open the switches $s_1$, $s_2$ and $s_6$ to connect its battery 100 to the DC bus 50.

In the alternative, if none of the peer computing devices 45 B-D has available excess power, then a power status/acknowledgement message is not sent at process 618 and the power router 60 takes on the role of the power provider. At process 636, the power router 60 determines which power source to use, the timing of the transmission and the amount of power to be transmitted. For example, the power router 60 may select to send power directly from the voltage regulating unit 68 by closing the switch $S_7$ and then controlling the voltage regulating unit output. At process 639, the power router 60 creates a message header, such as the header 81, and then transmits that message header at process 642 via the DC power bus 50. The power router 60 then follows up the message header 81 by sending the requested power packet 82 at process 645. The actual mechanism for sending the power packet 82 may be by closing the switch $S_7$ or by an alternative mechanism in addition to or instead of a switch.

Since the requesting computing device 45A is listening to the DC power bus 50, the computing device router controller 105 receives the power delivery header 81 sent by the power source in processes 630 or 642 and recognizes its IP address at process 654. As such, the receiving computing device 45A may shut its switch $s_4$ and realign its switch fabric at process 655 to recharge whichever component needs power. For example the computing device router/controller 105 may shut the switch $s_1$ and open $s_5$, $s_2$, $s_3$ allowing the capacitor $c_1$ to receive the incoming power packet at process 657. After the power packet 82 is received, the switch fabric is restored to its normal condition at process 660.

In the eventuality that the requesting computing device 45A does not receive the power packet 82 when it is required at process 651, the requesting computing device 45A may initiate a power down sequence as may be well known in the art at process 663. For example, the requesting computing device 45A may initiate a load shed of any or all sub-components within itself such as the electronic component A 110 or B 115. Alternatively, the requesting computing device 45A may suspend specific functions or commence an orderly shut down. The computing device router/control logic 105 may continue to function at maintenance levels such that it may accept delivery of a power packet 82 and revive any subcomponents 110 that may have been previously powered down when internal power levels in the battery 100, and capacitors $c_1$, $c_2$ and $c_3$ recover above preset levels.

Devices within the DC computing environment 40 may all fit into a prioritized scheme in the case of a low-power availability. Lower priority devices may be considered to be "expendable" as designated by the priority scheme. In a low power availability scenario the lowest priority devices may yield up their remaining power stores to higher priority devices via the DC power bus 50. The lower priority devices may then shut down gracefully. Higher priority devices would become lower priority devices as the power availability situations deteriorates until eventually all devices within the DC computing environment 40 power down.

It should be understood that the power request message 80 created at process 603 would have provided the capacitance to be charged and the then extrapolated future power level in the request message. The line resistance of the DC power bus 50 from the power source (the power router 60 or peer computing device 45 B-D) to the capacitor $c_1$ may be pre-calculated. Such information is a function of the physical design of the DC computing environment 40 and is therefore static. The power router 60 may use such information to choose a power source, power amount and the wave shape.

For example, the power router 60 may know from the power request message 80 that the capacitor $c_1$ is providing power to a critical electronic device within computing device 45A. It may also be told that it is high priority and the time requirement is 30 msec. The power router 60 may determine that the best way to get the proper amount of power to $c_1$ is to send a 100 volt impulse from impulse generator capacitor $C_c$. As such, the power router 60 may send the power delivery header to the computing device router 105 of the computing device 45A which informs the computing device controller 105 that the impulse is coming in 12 msec and causes the computing device controller 105 to close the normally open switch $s_4$ and realign its switch fabric to switch in capacitor $c_1$. Because the power is coming in impulse form, the computing device controller 105 may realign its switch fabric differently than if the power was coming in a square wave or a ramp wave form. Once the power packet is received the computing device router/controller 105 restores its switch fabric to its normal configuration at process 660.

The forgoing disclosure of the various embodiments has been presented for purposes of illustration and description. The disclosure is not intended to be exhaustive or to limit the subject matter to the examples disclosed. Many variations and modifications of the embodiments described herein will be obvious to one of the ordinary skill in the art in light of the above disclosure.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for receiving electric power within a computing environment comprising:
   broadcasting a power request message from a first electronic component within the computing environment, the power request message establishing at least an amount of power requested;
   receiving a power delivery message comprising a delivery message header and a power packet, the power packet including at least a portion of the requested power; and
   receiving an acknowledgement message confirming that the power packet is being addressed to the first electronic component, wherein the acknowledgement message defines the size of the power packet and establishes when the power packet will be dispatched.

2. The method of claim 1 wherein the delivery message header comprises a portion of the requested power.

3. The method of claim 1 wherein the power request message includes an identification of the first electronic component, indicates when the power packet is desired and indicates a delivery priority.

4. A power router comprising:
   a plurality of power sources; and
   a power router logic module, the power router logic module operative to:
      receive a power request message from an electronic component within a computing environment,
      determine a best available power source from the plurality of power sources based at least in part upon information contained in the power request message,
      initiate the transmission of a power delivery message including a delivery message header and a power packet in at least partial satisfaction of the power request message; and
      initiate the transmission of a power request acknowledgement message to the electronic component, wherein the power request acknowledgement message defines the size of the power packet and establishes when the power packet will be dispatched.

5. The power router of claim 4 wherein at least one of the plurality of power sources is a capacitor.

6. The power router of claim 5 wherein the power router logic module controls a switch in series with the capacitor.

7. The power router of claim 6 wherein the switch in series with the capacitor is a solid state device.

8. The power router of claim 4 wherein at least one of the plurality of power sources is a voltage regulator.

9. The power router of claim 4 wherein the power router logic module monitors the computing environment for power request messages, power delivery messages, and power status messages.

10. A power distribution system distributing power packets within a computing environment comprising:
    a source of direct current (DC) power thermodynamically isolated from the computing environment and delivering DC power to the computing environment; and
    within the computing environment:
       a power router,
       a computing device comprising at least one electronic component, and
       a DC power bus connecting the power router to the computing device, wherein the DC power bus distributes a power request message and a power delivery message between the power router and the computing device, the power delivery message including a delivery message header and a power packet in at least partial satisfaction of the power request message, wherein the DC power bus distributes a power request acknowledgement message between the power router and the computing device, wherein the power request acknowledgement message defines the size of the power packet and establishes when the power packet will be dispatched.

11. The power distribution system of claim 10 further comprising a messaging bus that transmits messages between the power router and the computing device.

12. The power distribution system of claim 11 wherein the message bus is asynchronous.

* * * * *